(12) United States Patent
Heanue et al.

(10) Patent No.: US 6,763,161 B2
(45) Date of Patent: *Jul. 13, 2004

(54) OPTICAL MICRODEVICE WITH ROTATABLE MICROACTUATOR

(75) Inventors: John F. Heanue, San Jose, CA (US); John H. Jerman, Palo Alto, CA (US)

(73) Assignee: IOLON, Inc., San Jose, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 09/972,259

(22) Filed: Oct. 5, 2001

(65) Prior Publication Data

US 2002/0012491 A1 Jan. 31, 2002

Related U.S. Application Data

(60) Continuation of application No. 09/464,373, filed on Dec. 15, 1999, now Pat. No. 6,301,403, and a continuation-in-part of application No. 09/271,440, filed on Mar. 18, 1999, which is a division of application No. 08/823,422, filed on Mar. 24, 1997, now abandoned.

(60) Provisional application No. 60/123,512, filed on Mar. 8, 1999, provisional application No. 60/112,263, filed on Dec. 15, 1998, provisional application No. 60/112,265, filed on Dec. 15, 1998, provisional application No. 60/025,801, filed on Aug. 27, 1996, provisional application No. 60/023,476, filed on Aug. 6, 1996, and provisional application No. 60/022,775, filed on Jul. 30, 1996.

(51) Int. Cl.⁷ .............................. G02B 6/26; G02B 26/08
(52) U.S. Cl. .............................. 385/18; 385/16; 385/19; 310/309; 359/198; 359/199; 359/223; 359/224; 359/226
(58) Field of Search .................... 385/16–20; 310/309; 359/196–226

(56) References Cited

U.S. PATENT DOCUMENTS

| | | |
|---|---|---|
| 5,000,534 A | 3/1991 | Watanabe et al. |
| 5,025,346 A | 6/1991 | Tang et al. |
| 5,153,870 A | 10/1992 | Lee et al. |
| 5,446,811 A | 8/1995 | Field et al. |
| 5,621,829 A | 4/1997 | Ford |

(List continued on next page.)

FOREIGN PATENT DOCUMENTS

EP     0650133 A2 *    4/1995

OTHER PUBLICATIONS

V. Dhuler, et al.; "A Novel Two Axis Actuator for High Speed Large Angular Rotation", 1997 International Conference on Solid–State Sensors and Actuators Chicago, Jun. 16–19, 1997, (1997) IEEE, pp. 327–330.

L. Field, et al.; "Micromachined 1×2 Optical Fiber Switch", Hewlett–Packard Laboratories, (1996) Elsevier Science (Sensors and Actuators A–53), pp. 311–315.

Meng–Hsiung Kiang, et al.; "Surface–Micromachined Electrostatic–Comb Driven Scanning Micromirrors for Barcode Scanners", Department of Electrical Engineers and Computer Sciences, University of California at Berkeley, (1996) IEEE, pp. 192–197.

(List continued on next page.)

Primary Examiner—Hemang Sanghavi
(74) Attorney, Agent, or Firm—Dorsey & Whitney LLP

(57) ABSTRACT

An optical microswitch comprising a support body and first and second output fibers carried by the body. A rotary electrostatic microactuator is carried by the body and extends in a plane. A micromirror is disposed out of the plane. The microactuator has a mirror holder coupled to the micromirror and at least one comb drive assembly coupled to the mirror holder for driving the micromirror about an axis of rotation extending perpendicular to the plane between a first position for reflecting a laser beam to the first output fiber and a second position for reflecting the laser beam to the second output fiber.

30 Claims, 5 Drawing Sheets

U.S. PATENT DOCUMENTS

| | | | | |
|---|---|---|---|---|
| 5,647,033 A | * | 7/1997 | Laughlin | 385/16 |
| 5,742,712 A | | 4/1998 | Pan et al. | |
| 5,748,812 A | | 5/1998 | Buchin | |
| 5,850,375 A | | 12/1998 | Wilde et al. | |
| 5,982,585 A | | 11/1999 | Fan et al. | |
| 6,000,280 A | * | 12/1999 | Miller et al. | 73/105 |
| 6,215,921 B1 | * | 4/2001 | Lin | 385/18 |
| 6,301,403 B1 | * | 10/2001 | Heanue et al. | 385/18 |
| 6,360,035 B1 | * | 3/2002 | Hurst et al. | 385/18 |
| 6,526,194 B1 | * | 2/2003 | Laor | 385/18 |

OTHER PUBLICATIONS

S. Kurth, et al.; "Silicon Mirrors and Micromirror Arrays for Spatial Laser Beam Modulation", Technical University Chemnitz–Zwickau. Department of Electrical Engineering & Information Technology, Germany, (1997) Elsevier Science (Sensors and Actuators A–66). pp. 76–82.

* cited by examiner

OPTICAL MICRODEVICE WITH ROTATABLE MICROACTUATOR

CROSS-REFERENCE TO RELATED APPLICATION

This application is a continuation application of U.S. patent application Ser. No. 09/464,373 filed Dec. 15, 1999, now U.S. Pat. No. 6,301,403 which claims priority to U.S. provisional patent application Serial No. 60/112,263 filed Dec. 15, 1998, to U.S. provisional patent application Serial No. 60/112,265 filed Dec. 15, 1998 and to U.S. provisional patent application Serial No. 60/123,512 filed Mar. 8, 1999, and is a continuation-in-part of U.S. patent application Ser. No. 09/271,440 filed Mar. 18, 1999, which application is a divisional of U.S. patent application Ser. No. 08/823,422 filed Mar. 24, 1997, abandoned, which application claims priority to U.S. provisional patent applications Serial No. 60/022,775 filed Jul. 30, 1996, to U.S. provisional application Serial No. 60/023,476 filed Aug. 6, 1996 and to U.S. provisional application Serial No. 60/025,801 filed Aug. 27, 1996, the entire contents of each of which are incorporated herein by this reference.

SCOPE OF THE INVENTION

The present invention relates generally to optical microswitches and more particularly to optical microswitches utilizing electrostatic microactuators with comb drive assemblies.

BACKGROUND

Optical switches have heretofore been provided. Many of such switches use macroscopic rotators. Switches utilizing electromagnetic motors have been disclosed to move either an input optical fiber or a refractive or reflective element interspersed between input and output optical fibers. Examples of such designs that use piezoelectric elements to move refractive or reflective elements are shown in U.S. Pat. No. 5,647,033 to Laughlin, U.S. Pat. No. 5,748,813 to Buchin and U.S. Pat. No. 5,742,712 to Pan et al. All of switches are relatively large and expensive.

A micromachined optical switch is disclosed in U.S. Pat. No. 5,446,811 to Field et al. and uses a bimetallic element to displace an optical fiber into alignment with one or more optical fibers. Such switch, however, is not easily extendable to a switch having a relatively large number of output fibers and bimetallic actuators are relatively slow.

Micromachined devices to tilt or rotate mirrors are known in the prior art, but suffer from various limitations. A one dimensional or two dimensional mirror rotator that tilts about axes in the plane of the substrate used to fabricate the device is disclosed in Dhuler et al., "A Novel Two Axis Actuator for High Speed Large Angular Rotation", Transducers '97, Vol. 1, pp. 327–330. The actuator uses a variable gap parallel plate capacitor as the drive element, which suffers from non-linear response of force or angular displacement as a function of applied voltage. A similar type of tilting mirror is described in Kruth et al., "Silicon Mirrors and Micromirror Arrays for Spatial Laser Beam Modulation", Sensors and Actuators A 66 (1998), pp. 76–82. Such mirrors are typically designed for use in projection displays or in scanners for bar code reading. A scanner using surface micromachining technology and having a mirror that is tilted out of the plane of the fabrication is described in Kiang et al., "Surface-Micromachined Electrostatic-Comb Driven Scanning Micromirrors for Barcode Scanners", Ninth Annual Int. Workshop on Micro Electro Mechanical Systems, San Diego, 1996, pp. 192–19997. All of such devices tend to have difficulty in maintaining flatness and smoothness in the mirror elements and may have difficulty in precise static positioning of the mirror due to hysteresis in the coupling between the electrostatic comb drive actuator in the plane of the substrate and the mirror element out of the substrate plane.

In general, it is an object of the present invention to provide a relatively inexpensive optical microswitch having a small form factor.

Another object of the invention is to provide an optical microswitch of the above character in which the reflective face of a micromirror rotates in the focal plane of a focusing lens.

Another object of the invention is to provide an optical microswitch of the above character in which first and second micromirrors are closely packed and disposed in the focal plane of a focusing lens.

Another object of the invention is to provide an optical microswitch of the above character which is capable of coupling visible or infrared light into an optical fiber with low transmission losses.

Another object of the invention is to provide an optical microswitch of the above character which has relatively fast switching times.

Another object of the invention is to provide an optical microswitch of the above character in which the mirror is capable of angular rotations over a relatively large range.

SUMMARY OF THE INVENTION

The present invention provides an optical microswitch comprising a support body and first and second output fibers. A rotary electrostatic microactuator is carried by the body and extends in a plane. A micromirror is disposed out of the plane. The microactuator has a mirror holder coupled to the micromirror and at least one comb drive assembly coupled to the mirror holder for driving the micromirror about an axis of rotation extending perpendicular to the plane between a first position for reflecting a laser beam to the first output fiber and a second position for reflecting the laser beam to the second output fiber.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

DESCRIPTION OF THE INVENTION

Figure 1:
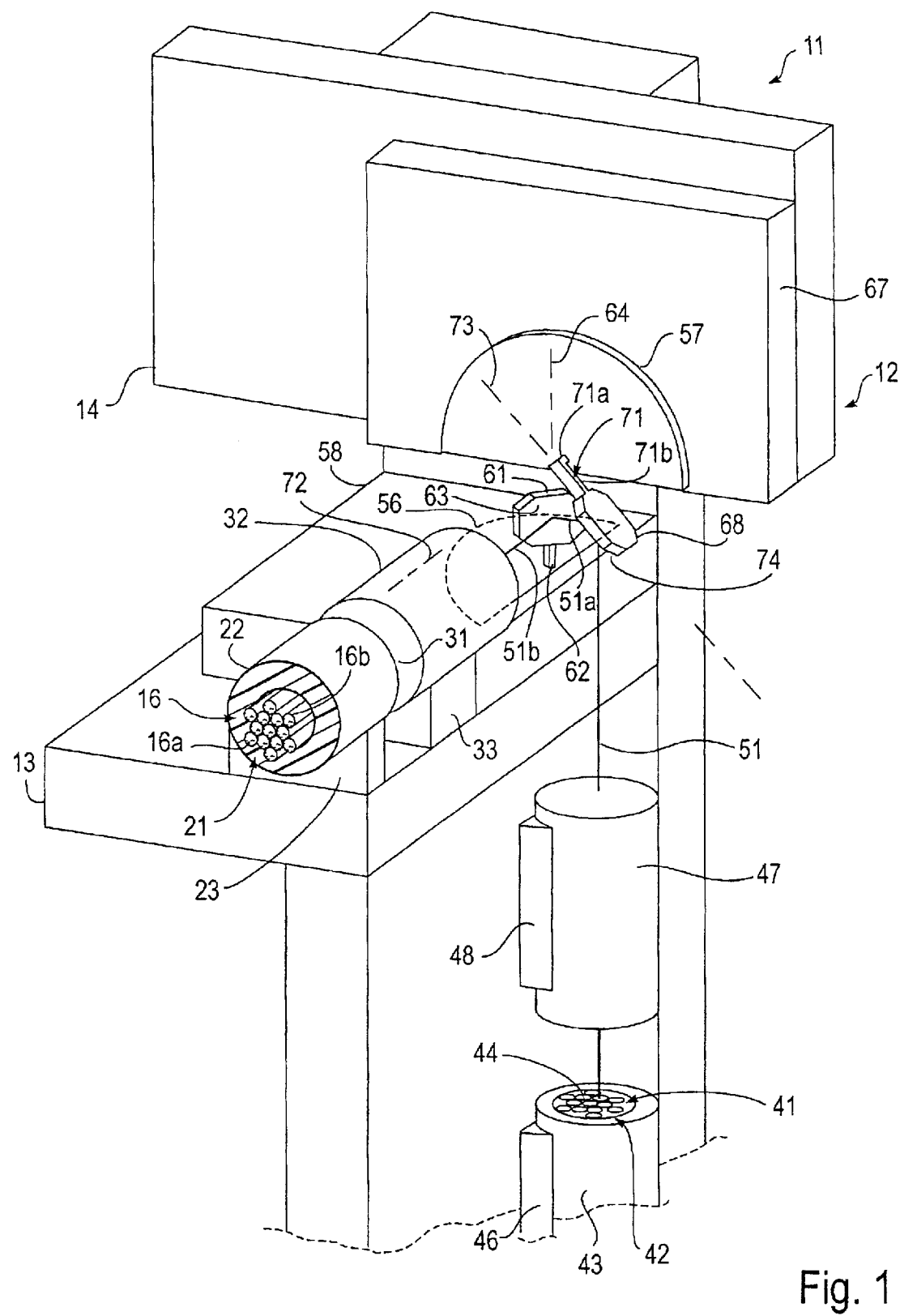
FIG. 1 is a perspective view of an optical microswitch with rotary electrostatic microactuator of the present invention.

Optical microswitch 11, shown schematically in FIG. 1, is formed from a support body 12 of any suitable size and shape and made from any suitable material such as a ceramic material. Body 12 shown in FIG. 1 has a base 13 and a back 14 secured to the base and extending perpendicularly from the base. Support body 12 is optionally coupled to one and as shown a plurality of output optical fibers 16, which can be either single mode or multi-mode fibers. In this regard, a bundle 21 of such output fibers 16 is secured together by a tube 22 mounted on base 13 by any suitable means such as bracket 23. The plurality of optical fibers 16 includes first and second optical fibers 16a and 16b. Tube 22 and output bundle 21 terminate at an end 31. A conventional focusing lens such as a GRIN lens 32 is disposed adjacent the end 31 of the fiber optic output bundle 21 and is mounted to base 13 by any suitable means such as bracket 33. Lens 32 has a sufficient field of view to accommodate all of fibers 16 in output bundle 21.

At least one and as shown a plurality of input optical fibers 41 can optionally be coupled to support body 13 for providing laser light to optical microswitch 11. The input optical fibers 41 are arranged in a bundle 42 secured together by any suitable means such as tube 43. Input fibers 41 terminate at respective ends 44. Input bundle 42 is secured to base 13 by any suitable means such as bracket 46. A conventional collimating lens such as GRIN lens 47 is disposed adjacent ends 44 and secured to base 13 by bracket 48 or any other suitable means. Lens 47 is perpendicular to lens 32. An input laser beam 51 from a laser source (not shown) is directed on a path by one of input optical fibers 41 through lens 47 to optical microswitch 11. The glass surfaces of fibers 16 and 41 and lenses 32 and 47 are coated in a conventional manner with an anti-reflective material.

First and second rotary electrostatic microactuators 56 and 57 are carried by support body 12 for alternatively coupling input laser beam 51 into first output fiber 16a or second output fiber 16b. First planar microactuator 56 is formed from a first planar rotator chip 58 secured to base 13 by any suitable means such as an adhesive (not shown). For simplicity, first microactuator 56 and first rotator chip 58 are shown schematically in FIG. 1. The first microactuator 56 is preferably disposed perpendicular to input laser beam 51 and parallel to the central longitudinal axis of output of lens 32. A first micromachined mirror 61 extends out of the plane of first microactuator 56 and is secured to the first microactuator by mean of a post 62 preferably formed integral with the micromachined mirror 61. Mirror 61 and post 62 are preferably micromachined separately from microactuator 56. Post 62 is joined at its base to the microactuator 56 by an adhesive (not shown) or any other suitable means. First mirror 61 has a reflective face or surface 63 and is rotatable by first microactuator 56 about an axis of rotation 64 extending through post 62 and disposed perpendicular to the plane of first microactuator 56. The axis of rotation 64 preferably intersects the reflective face 63 of micromirror 61 to ensure that face 63 is undergoing pure rotation. In addition, axis of rotation 64 is preferably placed at the focal plane of output lens 32.

Second planar microactuator 57 extends in a second plane and is substantially identical to first microactuator 56. The second microactuator 57 is formed from a second planar rotator chip 67 mounted to block 14 by any suitable means such as an adhesive (not shown). For simplicity, second microactuator 57 and second rotator chip 67 are shown schematically in FIG. 1. Second microactuator 57 is suspended over first microactuator 56 and is disposed perpendicular to the plane of the first microactuator. A second mirror 68 is carried by second microactuator 57 and is disposed out of the plane of the microactuator 57. Second micromachined mirror 68 is preferably formed with an L-shaped post 71 having a base portion or base 71a and a cantilever portion or extension 71b. Base 71a is secured to the microactuator 57 by an adhesive (not shown) or any other suitable means. Mirror 68 rotates about an axis of rotation 72 extending along base 71a and disposed perpendicular to the plane of second microactuator 57. The axis of rotation 64 of first mirror 61 and the axis of rotation 72 of second mirror 68 are preferably disposed in a plane extending perpendicular to the first and second microactuators 56 and 57. The mirrors 61 and 68 each have a sufficient range of rotation to permit the mirror 61 to direct laser beam 51, by means of lens 32, onto the core of each of optical fibers 16. Extension 71b is centered on an axis 73 extending parallel to the plane of second microactuator 57. Axis of rotation 64 of the first microactuator 56 and axis 73 are preferably disposed in a plane extending perpendicular to the first microactuator and parallel to the second microactuator. Second mirror 68 has a reflective face or surface 74 which is thus centered on the focal plane of lens 32. Reflective surfaces 63 and 74 of respective micromirrors 61 and 68 are highly reflective at the particular wavelength of laser beam 51.

Figure 2:
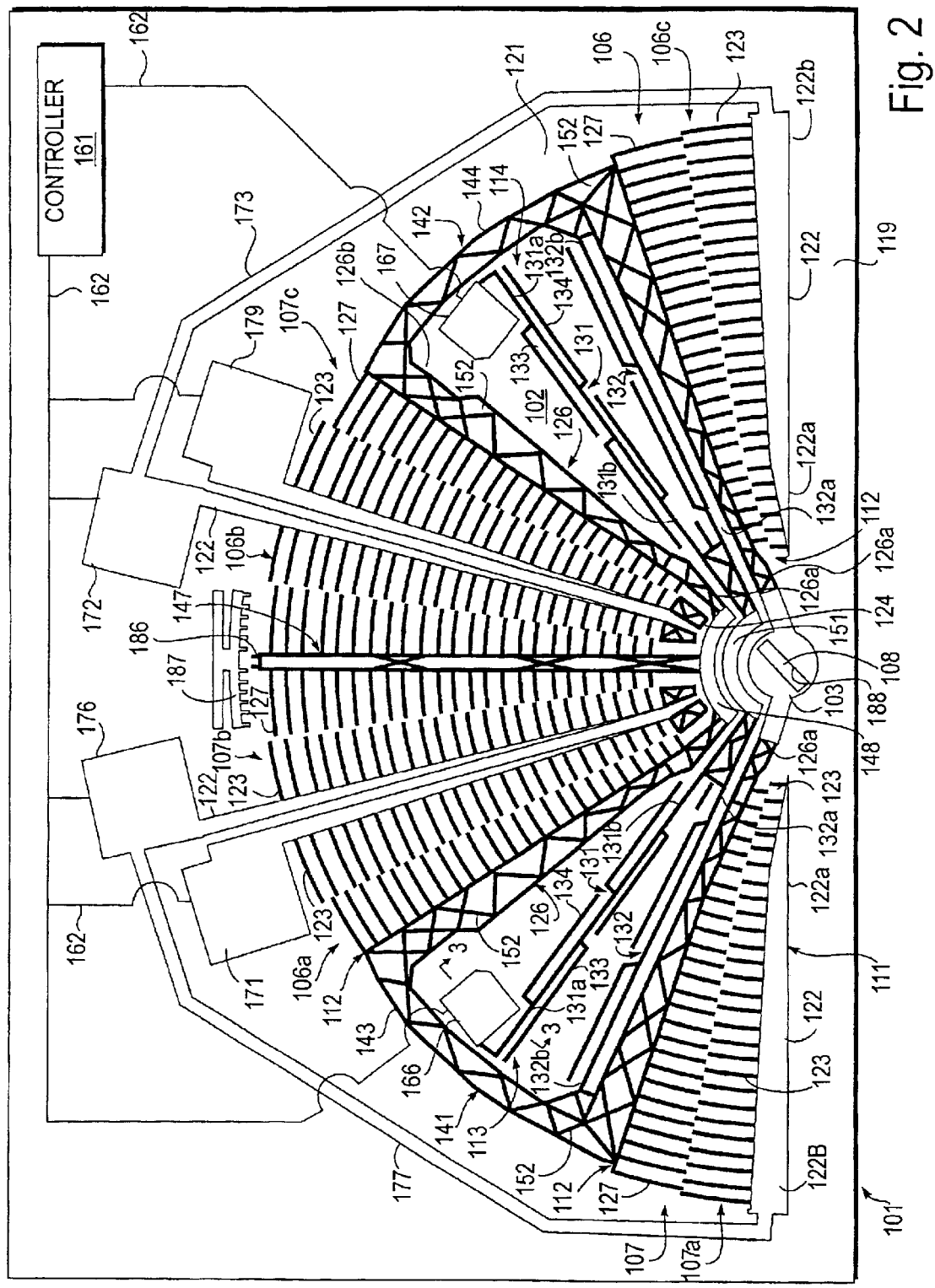
FIG. 2 is a plan view of a rotary electrostatic microactuator for use in the optical microswitch of FIG. 1.
Figure 3:
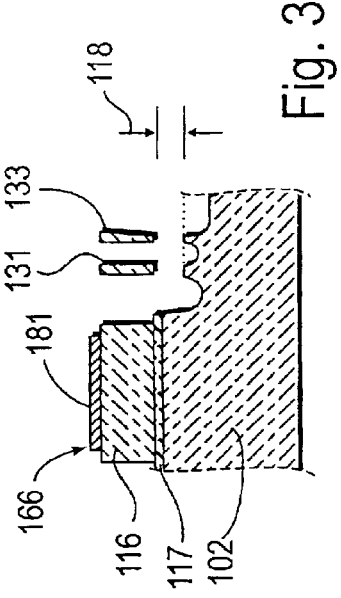
FIG. 3 is a cross-sectional view of the rotary electrostatic microactuator of FIG. 2 taken along the line 3—3 of FIG. 2.

Any suitable micromachined actuator can be utilized for first and second microactuators 56 and 57. Several preferred microactuators are disclosed in copending U.S. patent application Ser. No. 09/464,373 filed Dec. 15, 1999, the entire contents of which is incorporated herein by this reference. One particularly preferred rotary electrostatic microactuator 101, shown in FIGS. 2 and 3, is formed on a planar substrate 102 of the respective rotator chip 58 or 67. A rotatable member or circular mirror holder 103 overlies the substrate 102. A plurality of first and second comb drive assemblies 106 and 107 are carried by substrate 102 for rotating mirror holder 103 in first and second opposite angular directions about an axis of rotation 108 extending through the center of the circular mirror holder 103 perpendicular to planar substrate 102 and thus FIG. 2. Axis of rotation 108 corresponds to axes of rotations 64 and 72 of the respective microactuators 56 and 57. Each of the first and second comb drive assemblies 106 and 107 includes a first comb drive member or comb drive 111 mounted on substrate 102 and a second comb drive member or comb drive 112 overlying the substrate 102. First and second spaced-apart springs 113 and 114 are included in microactuator 101 for supporting or suspending second comb drives 112 and mirror holder 103 above the substrate 102 and for providing radial stiffness to the movable second comb drives 112 and thus the mirror holder 103.

Substrate 102 is made from any suitable material such as silicon and is preferably formed from a silicon wafer. The substrate has a thickness ranging from 200 to 600 microns and preferably approximately 400 microns. Mirror holder 103, first and second comb drive assemblies 106 and 107 and first and second springs 113 and 114 are formed atop the substrate 102 by a second or top layer 116 made from a wafer of any suitable material such as silicon. Top wafer 116 has a thickness ranging from 10 to 200 microns and preferably approximately 85 microns and is secured to the substrate 102 by any suitable means. The top wafer 116 is preferably fusion bonded to the substrate 102 by means of a silicon dioxide layer 117 having a thickness ranging from 0.1 to two microns and preferably approximately one micron. Top wafer 116 may be lapped and polished to the desired thickness. The mirror holder 103, the first and second comb drive assemblies 106 and 107 and the first and second springs 113 and 114 are formed from the top wafer 116 by any suitable means. Preferably, such structures are etched from wafer 116 using deep reactive ion etching (DRIE) techniques. Mirror holder 103 is spaced above substrate 102 by an air gap 118, that ranges from three to 30 microns and preferably approximately 15 microns, so as to be electrically isolated from the substrate.

At least one and preferably a plurality of first comb drive assemblies 106 are included in rotary electrostatic microactuator 101 and disposed about axis of rotation 108, shown as a point in FIG. 2, for driving mirror holder 103 in a clockwise direction about axis 108. At least one second comb drive assembly 107 and preferably a plurality of second comb drive assemblies 107 can be included in microactuator 101 for driving the mirror holder in a counterclockwise direction about the axis of rotation 108. Each of the first and second comb drive assemblies 106 and 107 extends substantially radially from axis of rotation 108 and, in the aggregate, subtend an angle of approximately 180° so as to provide rotary microactuator 101 with a semicircular or fanlike shape when viewed in plan (see FIG. 2). More specifically, microactuator 101 has three first comb drive assemblies 106a, 106b and 106c and three second comb drive assemblies 107a, 107b and 107c. Rotary microactuator 101 has a base 119 extending along a diameter of the semicircle formed by the microactuator 101 and has an outer radial extremity 121 resembling the arc of a semicircle. Radial extremity 121 has first and second ends which adjoin the first and second opposite ends of base 119. The radial extremity 121 is defined by the outer radial extremities of first and second comb drive assemblies 106 and 107. Mirror holder 103 and axis of rotation 108 are disposed at the center of the semicircle adjacent base 119.

First and second comb drive assemblies 106 and 107 are interspersed between each other, that is, a second comb drive assembly 107 is disposed between each pair of adjacent first comb drive assemblies 106. The first comb drive assemblies 106 are symmetrically disposed relative to the second comb drive assemblies 107 about the radial centerline of rotary electrostatic microactuator 101, that is the imaginary line extending in the plane of substrate 102 through axis of rotation 108 and perpendicular to base 119. Each of the first and second comb drive assemblies 106 and 107 has a length ranging from 200 to 2,000 microns and more preferably approximately 580 microns. Rotary microactuator 101 has a length measured along base 119 ranging from 500 to 5,000 microns and more preferably approximately 1,800 microns.

First comb drive 111 of each of first and second comb drive assemblies 106 and 107 is mounted to substrate 102 by means of silicon dioxide layer 117. As such, the first comb drives 111 are immovably secured to substrate 102. Each of the first comb drives 111 has a radially-extending bar 122 provided with a first or inner radial portion 122a and a second or outer radial portion 122b. Outer portion 122b extends to outer radial extremity 121 of microactuator 101. A plurality of comb drive fingers 123 are longitudinally spaced apart along the length of bar 122 at a separation distance ranging from eight to 50 microns and preferably approximately 24 microns. The comb drive fingers 123 extend substantially perpendicularly from bar 122 and are each arcuate in shape. More specifically, each comb finger 123 has a substantially constant radial dimension relative to axis of rotation 108 as it extends outwardly from the bar 122. Fingers 123 have a length ranging from approximately 22 to 102 microns and increase substantially linearly in length from bar inner portion 122a to bar outer portion 122b. Although the comb fingers 123 can vary in width along their length, the comb fingers 123 are shown as having a constant width ranging from two to 12 microns and preferably approximately six microns. Bar inner portions 122a for first comb drive assemblies 106a and 106b and second comb drive assemblies 107b and 107c are joined to a base member 124 which serves to anchor such bars 122 to substrate 102 and permit such bar inner portions 122a to thus have a smaller width and the related comb drives 123 to have a corresponding longer length.

Second comb drives 112 are spaced above substrate 102 by air gap 118 so as to be movable relative to substrate 102 and relative to first comb drives 111. The second comb drives 112 have a construction similar to the first comb drives 111 discussed above and, more specifically, are formed with a bar 126 that extends radially outwardly from axis of rotation 108. The bar 126 has a first or inner radial portion 126a in close proximity to axis 108 and a second or outer radial portion 126b that extends to radial extremity 121. A plurality of comb drive fingers 127 are longitudinally spaced apart along the length of bar 126 and are substantially similar to comb fingers 123. Arcuate comb fingers 127 are offset relative to comb fingers 123 so that the comb fingers 127 on second comb drive 112 can interdigitate with comb fingers 123 on first comb drive 111 when the second comb drives 112 are rotated about axis 108 towards the stationary first comb drives 111. Each of first and second comb drive assemblies 106 and 107 resembles a sector of the semicircular microactuator 101.

Means including first and second spaced-apart springs 113 and 114 are included within rotary electrostatic microactuator 101 for movably supporting second comb drives 112 over substrate 102. First and second suspension elements or springs 113 and 114 each have a length which preferably approximates the length of first and second comb drive assemblies 106 and 107, however springs having lengths less than the length of the comb drive assemblies can be provided. Although first and second springs 113 and 114 can each be formed from a single spring member, the springs 113 and 114 are each preferably U-shaped or V-shaped in conformation so as to be a folded spring. As shown, springs 113 and 114 are substantially U-shaped. Each of springs 113 and 114 is made from first and second elongate spring members 131 and 132. First or linear spring member 131 has first and second end portions 131a and 131b and second or linear spring member 132 has first and second end portions 132a and 132b.

The first end portion 131a of each folded spring 113 and 114 is secured at its end to substrate 102 adjacent axis of rotation 108 by means of silicon dioxide layer 117 (see FIG. 3). The balance of the spring is spaced above the substrate by air gap 118. Second end portion 131b of each spring 113 and 114 is secured to first end portion 132a of the second spring member 132. First and second beam-like spring members 131 and 132 each extend radially outwardly from axis of rotation 108 and preferably have a length approximating the length of first and second comb drive assemblies 106 and 107. The spring members 131 and 132 are preferably approximately equal in length and each have a length of approximately 500 microns. As such, spring first end portions 131a are secured to substrate 102 adjacent spring second end portions 132b. Although first end portion 131a of each spring 113 and 114 can be secured to substrate 102 adjacent mirror holder 103 or adjacent outer radial extremity 121, the first end portion 131a is preferably secured to substrate 102 adjacent outer radial extremity 121. First and second spring members 131 and 132 each have a width ranging from one to 10 microns and preferably approximately four microns. First and second thin, elongate sacrificial bars 133 and 134, of a type described in U.S. Pat. No. 5,998,906 and in copending U.S. patent application Ser. No. 09/135,236 filed Aug. 17, 1998, the entire contents of each of which are incorporated herein by this reference, extend along each side of each spring member 131 and 132 for ensuring even etching and thus the desired rectangular cross section of the spring members. Sacrificial bars 133 and 134 are disposed along opposite sides of the spring members and extend parallel to the respective spring member.

Second end portion 132b of each spring 113 and 114 is secured to at least one of second comb drives 112. In this regard, first and second movable frame members or frames 141 and 142, spaced above substrate 102 by air gap 118, are provided in rotary electrostatic microactuator 101. Each of the frames 141 an 142 is substantially U-shaped in conformation and includes as side members bars 126 of the adjoining second comb drives 112. More specifically, first movable frame 141 includes bar 126 of second comb drive assembly 107a, bar 126 of first comb drive assembly 106a and an arcuate member 143 which interconnects such bar outer portions 126b. Second movable frame 142 is similar in construction and includes as side members bar 126 of second comb drive assembly 107c, bar 126 of first comb drive assembly 106c and an arcuate member 144 which interconnects such bar outer portions 126b. Second end portion 132b of first spring 113 is secured to arcuate member 143 adjacent to bar outer portion 126b of second comb drive assembly 107a, while the second end portion 132b of second spring 114 is secured to arcuate member 144 adjacent bar outer portion 126b of first comb drive assembly 106c. In this manner, first folded spring 113 is disposed inside first movable frame 142 and second folded spring 114 is disposed inside second movable frame 142. Bar inner portion 126a of second comb drive assembly 107a is joined to mirror holder 103 and serves to secure first spring 113 to the mirror holder. Similarly, bar inner portion 126a of first comb drive assembly 106c is joined to mirror holder 103 for interconnecting second spring 114 to the mirror holder.

First and second movable frames 141 and 142 are symmetrically disposed about the radial centerline of rotary electrostatic microactuator 101. At least one comb drive assembly and preferably at least one first comb drive assembly 106 and at least one second comb drive assembly 107 are disposed between first and second movable frames 141 and 142 and thus first and second springs 113 and 114. More specifically, first comb drive assemblies 106a and 106b and second comb drive assemblies 107b and 107c are disposed between frames 141 and 142. Bar 126 of second comb drive assembly 107b and bar 126 of first comb drive assembly 106b are joined back to back to form a third movable frame 147 preferably extending along the centerline of microactuator 101 between movable frames 141 and 142. An inner arcuate member or shuttle 148 is joined at opposite ends to first and second movable frames 141 and 142. One end of rigid shuttle 148 is secured to bar inner portion 126a of first comb drive assembly 106a while the second end of the shuttle 148 is secured to bar inner portion 126a of second comb drive assembly 107c. Third movable frame 147 is joined to the middle of the shuttle 148 so as to rotate in unison with first and second movable frames 141 and 142 about axis 108. An additional arcuate member 151 is provided in microactuator 101 for rigidly securing together second end portions 131b of first and second springs 113 and 114. The arcuate member 151 overlies substrate 102 and extends at least partially around the axis of rotation 108. Member 151 is disposed between shuttle 148 and mirror holder 103 and rotates about axis 108 free of mirror holder 103. The suspended structures of microactuator 101, that is mirror holder 103, second comb drives 112, first and second springs 131 and 132 and first and second movable frames 141 and 142, each have a thickness ranging from 10 to 200 microns and preferably approximately 85 microns.

Second comb drives 112 of first and second comb drive assemblies 106 and 107 are movable in a direction of travel about axis of rotation 108 by means of movable frames 141, 142 and 147 between respective first positions, as shown in FIG. 2, in which comb drive fingers 123 and 127 of the first and second comb drives are not substantially fully interdigitated and respective second positions, not shown, in which the comb drive fingers 123 and 127 are substantially fully interdigitated. Although comb drive fingers 123 and 127 can be partially interdigitated when second comb drives 112 are in their first positions, the comb fingers 123 and 127 are shown as being fully disengaged and thus are not interdigitated when second comb drives 112 are in their first positions. When in their second positions, comb fingers 127 of second comb drives 112 extend between respective comb drive fingers 123 of the first comb drives 111. Comb fingers 127 approach but preferably do not engage bar 122 of the respective first comb drives 111 and similarly comb drive fingers 123 approach but preferably do not engage bar 126 of the respective second comb drives 112. Rigid movable frames 141, 142 and 147 are constructed as light weight members to decrease the mass and moment of inertia of the movable portions of microactuator 101 and thus facilitate rotation of second comb drives 112 and mirror holder 103 about axis of rotation 108. Each of the movable frames 141, 142 and 147 is substantially hollow and formed with a plurality of internal beams or trusses 152 for providing rigidity to the movable frame.

Electrical means is included within microactuator 101 for driving second comb drives 112 between their first and second positions. Such electrical means includes a controller and voltage generator 161 that is electrically connected to a plurality of electrodes provided on substrate 102 by means of a plurality of electrical leads 162. Controller 161 is shown schematically in FIG. 2. A first ground electrode 166 and a second ground electrode 167 are formed on substrate 102 and are respectively joined to the first end portion 131a of first and second springs 113 and 114 for electrically grounding second comb drives 112 and mirror holder 103. Electrodes 166 and 167 serve as the attachment points for spring first end portions 131a to the substrate 102. First comb drives 111 of first comb drive assemblies 106 can be supplied a voltage potential from controller 161 by means of an electrode 171 electrically coupled to bar outer portion 122b of first comb drive assembly 106a and an additional electrode 172 electrically coupled to the first comb drive 111 of first comb drive assembly 106b and to first comb drive 111 of first comb drive assembly 106c by lead 173. An electrode 176 is secured to the first comb drive 111 of second comb drive assembly 107a by means of lead 177 and to second comb drive assembly 107b and an electrode 179 is joined to bar outer portion 122b of second comb drive assembly 107c for providing a voltage potential to the first comb drives of second comb drive assemblies 107. A metal layer 181 made from aluminum or any other suitable material is created on the top surface of top wafer 116 for creating electrodes 166, 167, 171, 172, 176 and 179 and for creating leads 173, 174, 177 and 178 (see FIG. 2). First and second pointers 186 extend radially outwardly from the outer end of third movable frame 147 for indicating the angular position of mirror holder 103 about axis 108 on a scale 187 provided on substrate 102.

Means in the form of a closed loop servo control can be included in microactuator 101 for monitoring the position of second comb drives 112 and thus mirror holder 103. For example, controller 161 can determine the position of the movable comb drives 112 by means of a conventional algorithm included in the controller for measuring the capacitance between comb drive fingers 127 of the movable comb drives 112 and the comb drive fingers 123 of the stationary comb drives 111. A signal separate from the drive signal to the comb drive members can be transmitted by controller 161 to the microactuator for measuring such capacitance. Such a method does not require physical contact between the comb drive fingers. Alternatively, a portion of the output optical energy coupled into the output fiber 16 can be diverted and measured and the drive signal from the controller 161 to the microactuator 101 adjusted until the measured optical energy is maximized.

In operation and use of optical microswitch 11, first and second microactuators 56 and 57 are utilized to respectively rotate first and second mirrors 61 and 68 to direct input laser beam 51 to either first or second output fibers 16a or 16b or any of the other optical fibers 16 of output bundle 21. Mirror holder 103 of the respective microactuator 101 can be rotated in opposite first and second directions of travel about axis of rotation 108 by means of controller 161. The amount of rotation can be controlled by the amount of voltage supplied to the appropriate first comb drives 111 of the microactuator 101. As shown in FIG. 1, laser beam 51 is launched by input lens 57 onto the reflective surface 74 of second mirror 68, from which the beam 51a is reflected onto surface 63 of first mirror 61. Input laser beam 51b is reflected by the first mirror 61 onto the desired portion of the image plane of output lens 32 so that the laser beam 51 is focused and coupled by lens 32 into the appropriate optical fiber 16 of output bundle 21.

Rotation of second mirror 68 in first and second opposite directions about axis of rotation 72 by second microactuator 57 controls the vertical position relative to first microactuator 56 at which the reflected beam 51a strikes reflective face 63 on the axis of rotation 64 of the first mirror 61. Rotation of the first mirror 61 about axis of rotation 64 by first microactuator 56 controls the horizontal position relative to the first microactuator 56 at which the beam 51b reflected by the first mirror strikes output lens 32. In this manner, input laser beam 51 can be directed by the first and second mirrors 61 and 68 into any one of the optical fibers of output bundle 21. For example, rotation of first micromirror 61 to a first position and rotation of second micromirror 68 to a first position reflects the laser beam 51 to first output fiber 16a, while rotation of first micromirror 61 to a second position and rotation of second micromirror 68 to a second position reflects the laser beam 51 to second output fiber 16b. The position of the mirror holders 103 of microactuators 56 and 57 and thus mirrors 61 and 68 can optionally be monitored in the manner discussed above with respect to microactuator 101. Micromirrors 61 and 68 are each capable of rotating at speeds less than five milliseconds between fibers 16 with optical losses of less than one dB.

In its rest position, second mirror 68 is aligned on second microactuator 57 so its reflective surface 74 is capable of reflecting input laser beam 51 from the center of input lens 47 onto the center of the first mirror 61. Similarly, first mirror 61 is angularly disposed relative to first microactuator 56 so that when the first mirror is in its rest position, the input beam 51a impinging the first mirror 61 is reflected by the first mirror onto the center of output lens 32. Such positioning of first and second mirrors 61 and 68 relative to first and second microactuators 56 and 57 minimizes the rotational travel of the mirrors during the operation of optical microswitch 11. The first and second mirrors 61 and 68 are each capable of +/−six degrees angular rotation, that is a rotation of six degrees in both the clockwise and counterclockwise directions for an aggregate rotation of twelve degrees.

The fanlike shape of first and second microactuators 56 and 57 permits respective first and second mirrors 61 and 68 to be mounted along the base 119 of the respective microactuator 101. For example, the placement of first mirror 61 on such base 119 of first microactuator 56 permits the microactuator 56 to be positioned along one side of first rotator chip 58 and support base 13 so that input laser beam 51 has a path to second mirror 68 that is unobstructed by the microactuator 56. Second mirror 68 overhangs such side of rotator chip 58. Similarly, the fanlike shape of second microactuator 57 permits the microactuator 57 to overhang first microactuator 56. Second mirror 68 advantageously rotates about axis 72 disposed along the base 119 of second microactuator 57 and overhangs second microactuator 57 so as to be in close proximity to first mirror 61. This close placement of first and second mirrors 61 and 68 minimizes the length of base 71a of second mirror post 71 and the optical path of input laser beam 51.

The separate fabrication of first and second mirrors 61 and 68 allows for larger choice of reflective coatings for the mirrors, including multilayer dielectric mirrors, enhanced metallic mirrors and metallic mirrors otherwise incompatible with micromachining fabrication steps such as sacrificial release or high temperature processing. The separate mirrors 61 and 68 can be fabricated on relatively thick and very smooth flat substrates, which is difficult to achieve with an integrated micromachined process. In addition, mirrors rotating above and out of the plane of the substrate 102 allow for novel mechanical layout and packaging of microswitch 11, particularly the close coupling of microactuators 56 and 57.

The utilization of rotary electrostatic microactuators, and particularly electrostatic microactuators having a fanlike shape or other shape that permits the axis of rotation to be placed along a side of the microactuator, allows the optical microswitch 11 to have a relatively small form factor of less than approximately one cubic centimeter. Microactuators 56 and 57 desirably require relatively low power and permit rapid switching between fibers. Microswitch 11 is particularly suited for use as an optical switch in a fiber optic network of a telecommunications system. However, the optical microswitch 11 can be used in other applications, such as in computer data storage systems, and more specifically in an optics module of a magneto-optical data storage system. Other applications include data networks and cable television systems.

Although optical microswitch 11 is shown for use with a plurality of input optical fibers 41, a single input fiber 41 can be provided. Alternative, input laser beam 51 can be supplied from any other suitable source, such as directly from a laser in close proximity to or mounted on support body 12. In addition, it should be appreciated that microswitch 11 can be bidirectional, that is optical fibers 16 can serve as input fibers and optical fibers 41 can serve as output fibers.

Figure 4:
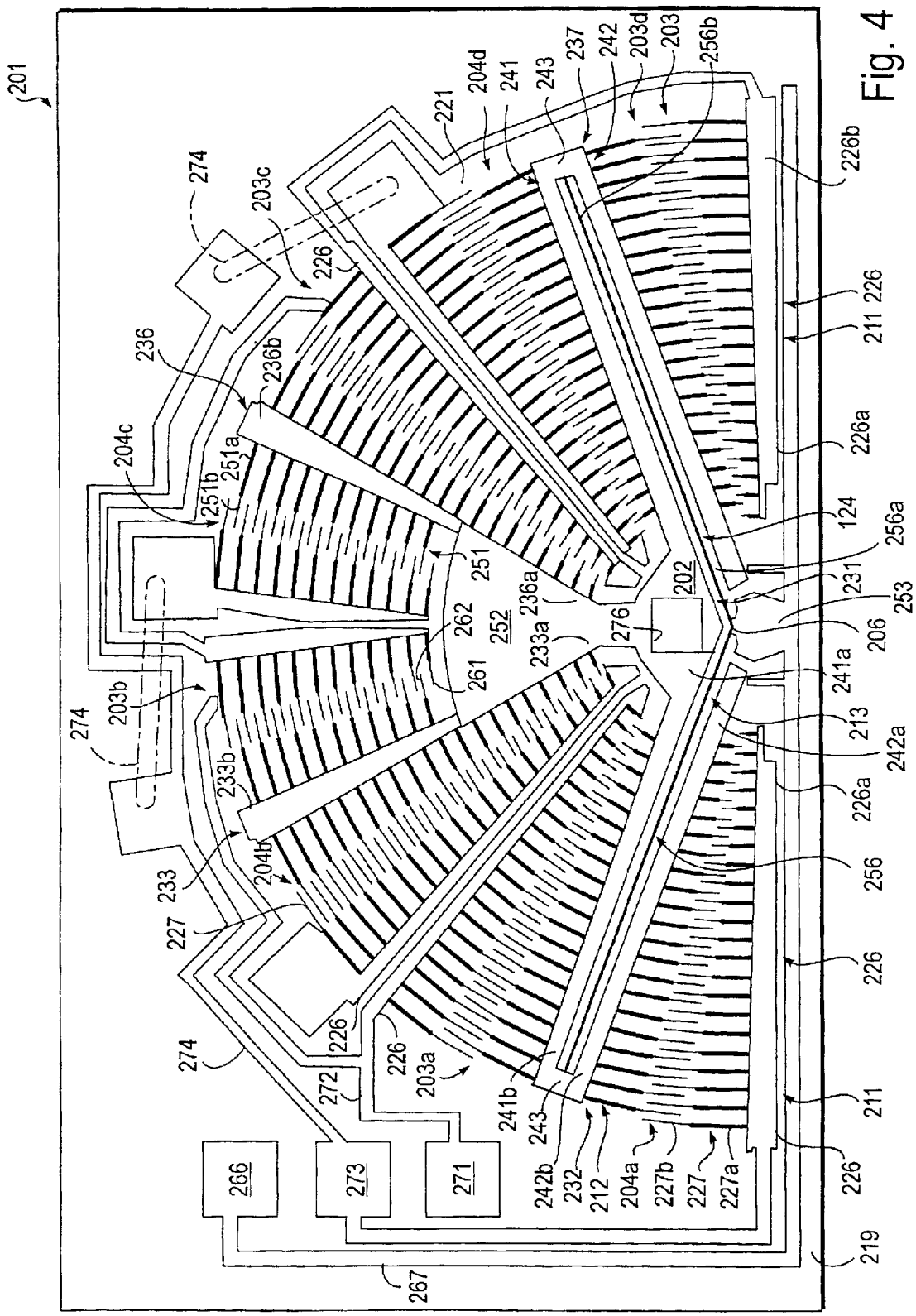
FIG. 4 is a plan view of another embodiment of a rotary electrostatic microactuator for use in the optical microswitch of FIG. 1.

Another rotary electrostatic microactuator disclosed in copending U.S. patent application Ser. No. 09/464,373 filed Dec. 15, 1999 [Our File No. A-68185] and suitable for use as first and/or second microactuators 56 and 57 in optical microswitch 11 is shown in FIG. 4. Microactuator 201 therein has similarities to microactuator 101 and like reference numerals have been used to describe like components of microactuators 101 and 201. A rotatable member or mirror holder 202 overlies substrate 102 of the respective rotator chip 58 or 67. A plurality of first and second comb drive assemblies 203 and 204 are carried by the substrate 102 for rotating the mirror holder 202 in first and second opposite direction about an axis of rotation 206 extending perpendicular to planar substrate 102. Axis of rotation 206 corresponds to axes of rotations 64 and 72 of the respective microactuators 56 and 57. The axis of rotation is shown as a point in FIG. 4 and labeled by reference line 206. Each of the first and second comb drive assemblies 203 and 204 includes a first drive member or comb drive 211 mounted on substrate 102 and a second comb drive member or comb drive 212 overlying the substrate. First and second spaced-apart springs 213 and 214 are included in microactuator 201 for supporting or suspending second comb drives 212 and mirror holder 202 above the substrate 102 and for providing radial stiffness to the second comb drives 212 and the mirror holder 202. The mirror holder 202, first and second comb drive assemblies 203 and 204 and first and second springs 213 and 214 are formed from top layer 116 by any suitable means such as discussed above for microactuator 101. Mirror holder 202, second comb drives 212 and first and second springs 213 and 214 are spaced above substrate 102 by air gap 188 and have thicknesses similar to those discussed above for the like components of microactuator 101.

At least one and preferably a plurality of first comb drive assemblies 203 are included in rotary electrostatic microactuator 201 and disposed about axis of rotation 206 for driving mirror holder 202 in a clockwise direction about axis of rotation 206. At least one and preferably a plurality of second comb drive assemblies 204 can be included in microactuator 201 for driving the mirror holder in a counterclockwise direction about the axis of rotation 206. Each of the first and second comb drive assemblies 203 and 204 extends substantially radially from axis of rotation 108 and the assemblies 203 and 204, in the aggregate, subtend an angle of approximately 180° to provide the semicircular or fanlike shape to microactuator 201. More particularly, microactuator 201 has four first comb drive assemblies 203a, 203b, 203c and 203d and four second comb drive assemblies 204a, 204b, 204c and 204d. The first comb drive assemblies 203 are interspersed between the second comb drive assemblies 204. The rotary microactuator 201 has a base 219 substantially similar to base 119 and an outer radial extremity 221 substantially similar to outer radial extremity 121. First comb drive assemblies 203 are symmetrically disposed relative to second comb drive assemblies 204 about the radial centerline of rotary electrostatic microactuator 201, that is the imaginary line extending in the plane of substrate 102 through axis of rotation 206 perpendicular to base 219. Mirror holder 202 and axis of rotation 206 are disposed at the center of microactuator 201 adjacent base 219. The rotary microactuator has a length measured along base 219 ranging from 500 to 5,000 microns and preferably approximately 2,000 microns.

First comb drive 211 of each of first and second comb drive assemblies 203 and 204 is mounted to substrate 101 in the manner discussed above with respect to first comb drives 111. Each of the first comb drives 211 has a radial-extending bar 226 provided with a first or inner radial portion 226a and a second or outer radial portion 226b. The outer portion 226b of each first comb drive 211 extends to outer radial extremity 221. A plurality of comb drive fingers 227 are longitudinally spaced apart along the length of bar 226 at a separation distance ranging from eight to 50 microns and preferably approximately 35 microns. The comb drive fingers 227 extend substantially perpendicularly from bar 226 and, like comb drive fingers 123, are each arcuate in shape. Fingers 227 have a length ranging from 25 to 190 microns and increase substantially linearly in length from bar inner portion 226a to bar outer portion 226b. Each of the comb drive fingers 227 has a proximal portion 227a and a distal portion 227b. The proximal portion 227a has a width ranging from four to 20 microns and preferably approximately 10 microns, and the distal portion 227b has a width less than the width of proximal portion 227a and, more specifically, ranging from two to 12 microns and preferably approximately six microns.

Second comb drives 212 and mirror holder 202 are part of a movable or rotatable frame 231 spaced above substrate 102 by air gap 118 so as to be electrically isolated from the substrate and movable relative to the substrate and first comb drives 211. Frame 231 includes a first arm 232, a second arm 233, a third arm 236 and a fourth arm 237, each of which extend in a substantial radial direction from axis of rotation 206. First and fourth arms 232 and 237 are symmetrically disposed relative to the centerline of microactuator 101 and second and third arms 233 and 236 are also symmetrically disposed relative to such centerline. First and fourth arms 232 and 237 are each U-shaped in conformation and formed from first and second bars 241 and 242. The first bar 241 has a first or inner radial portion 241a in close proximity to axis 206 and a second or outer radial portion 241b that extends to outer radial extremity 221. Similarly, second bar 242 has a first or inner radial portion 242a and a second or outer radial portion 242b. Outer radial portions 241b and 242b are joined by a base member 243 at outer radial extremity 221. Inner radial portion 241a of the first bar 241 is joined to mirror holder 202, while inner radial portion 242a of second bar 242 extends freely adjacent the mirror holder 202. Second and third arms 233 and 236 are joined at their inner portions to mirror holder 202.

First bar 241 of first arm 232 forms part of second comb drive 212 of first comb drive assembly 203a, while second bar 242 of first arm 232 serves as part of the second comb drive 212 of second comb drive assembly 204a. A plurality of comb drive fingers 251 are longitudinally spaced apart along the length of such first bar 241 for forming the comb drive fingers of first comb drive assembly 203a, while a plurality of comb drive fingers 251 are longitudinally spaced apart along the length of second bar 242 of such first arm 232 for forming the comb drive fingers of first comb drive assembly 204a. Comb drive fingers 251 are substantially similar to comb drive fingers 227 and have a first or proximal portion 251a joined to the respective bar 241 or 242 and a second or distal portion 251b extending from such proximal portion 251a. Distal portions 251b have a width less than the width of proximal portions 251a. Arcuate comb drive fingers 251 are offset relative to comb drive fingers 227 so that comb drive fingers 251 can interdigitate with comb drive fingers 227. First bar 241 of fourth arm 237 similarly serves as part of second comb drive 212 of second comb drive assembly 204d, while second bar 242 of the fourth arm 237 serves as part of the second comb drive 212 for first comb drive assembly 203d. Comb drive fingers 251 extend from first and second bars 241 and 242 of fourth arm 237.

Second and third arms 233 and 236 are included in second comb drives 212 of first comb drive assemblies 203b and 203c and second comb drive assemblies 204b and 204c. The second arm 233 has a first or inner radial portion 233a joined to mirror holder 202 and a second or outer radial portion 233b adjacent outer radial extremity 221. Third arm 236 is similar in construction to second arm 233 and has a first or inner radial portion 236a and a second or outer radial portion 236b. A first plurality of comb drive fingers 251 are longitudinally spaced apart along the length of one side of second arm 233 for forming the second comb drive of second comb drive assembly 204b and a second plurality of comb drive fingers 251 are longitudinally spaced apart along the length of the other side of second arm 233 for forming the second comb drive of first comb drive assembly 203b. Similarly, a first plurality of comb drive fingers 251 are longitudinally spaced apart along one side of third arm 236 for forming second comb drive 212 of first comb drive assembly 203c and a second plurality of comb drive fingers 251 are longitudinally spaced apart along the opposite side of the third arm 236 for forming second comb drive 212 of second comb drive assembly 204c. The second and third arms 233 and 236 can optionally be joined by a link 252 at the respective inner radial portions 233 and 236a for enhancing the rigidity of the arms 233 and 236.

Means including first and second spaced-apart springs 213 and 214 are included within rotary electrostatic microactuator 201 for movably supporting mirror holder 202 and second comb drives 212 over substrate 102. Springs 213 and 214 are symmetrically disposed about the centerline of microactuator 201 and preferably have a length which approximates the length of at least some of first and second comb drive assemblies 203 and 204. Base 219 of microactuator 201 includes an attachment or bracket member 253 which has a portion intersecting axis of rotation 206 and serves to secure first and second springs 213 and 214 to substrate 102. Each of the springs 213 and 214 is formed from a single beam-like spring member 256 having a first or inner radial end portion 256a joined at its end to bracket member 253 and a second or outer radial end portion 256b joined to base member 243 of the respective first arm 232 or fourth arm 237. More specifically, first spring 213 extends from bracket member 253 up the center of first arm 232 for joinder to the center of base member 243. Second spring 214 extends from bracket member 253 radially outwardly through the center of fourth arm 237 for joinder to the center of base member 243. Inner end portions 256a of spring members 256 are joined to the bracket member 253 at axis of rotation 206. The spring members 256 have a width ranging from one to 10 microns and preferably approximately four microns. Respective first and fourth arms 232 and 237 serve to secure outer end portions 256b of the first and second springs 213 and 214 to mirror holder 202.

At least one comb drive assembly and preferably at least one first comb drive assembly 203 and at least one second comb drive assembly 204 is disposed between first and second springs 213 and 214. More specifically, first comb drive assemblies 203b and 203c and second comb drive assemblies 204b and 204c, each of which is formed in part by second and third arms 233 and 236, are angularly disposed between first and second springs 213 and 214. Additionally, first comb drive assembly 203a and second comb drive assembly 204d, symmetrically disposed relative to each other about the centerline of microactuator 201, are angularly disposed between first and second springs 213 and 214.

Comb drive fingers 227 and 251 of first and second comb drives 211 and 212 are not substantially fully interdigitated when in their first or rest positions shown in FIG. 4. Although the term not substantially fully interdigitated is broad enough to cover comb drive fingers which are not interdigitated when in their rest positions, such as comb drive fingers 123 and 127 of microactuator 101 shown in FIGS. 2 and 3, such term also includes comb drive fingers which are partially interdigitated when in their rest positions. In microactuator 201, distal portions 227b and 251b of the comb drive fingers are substantially interdigitated when the comb drives 211 and 212 are in their at rest positions.

At least one and as shown all of first and second comb drive assemblies 203 and 204 are not centered along a radial extending outwardly from axis of rotation 206. In this regard, distal ends 261 of comb drive fingers 227 for each comb drive assembly 203 or 204 are aligned along an imaginary line that does not intersect axis of rotation 206 and, as such, is spaced-apart from the axis 206. Similarly, distal ends 262 of comb fingers 251 extend along an imaginary line which does not intersect axis of rotation 206. Each of first and second comb drive assemblies 203 and 204 thus resembles a sector of a semicircle that is offset relative to a radial of such semicircle.

Second comb drives 212 of first and second comb drive assemblies 203 and 204 are each movable in a direction of travel about axis of rotation 206 between a first or rest position, as shown in FIG. 4, in which comb drive fingers 227 and 251 are not substantially fully interdigitated and a second position (not shown) in which comb drive fingers 227 and 251 are substantially fully interdigitated such as discussed above with respect to comb fingers 123 and 127 of microactuator 101. Second comb drives 212 of first comb drive assemblies 203 are in their second positions when second comb drives 212 of second comb drive assemblies 204 are in their first positions and, similarly, the second comb drives 212 of assemblies 204 are in their second positions when the second comb drives 212 of assemblies 203 are in their first positions.

Electrical means is included within microactuator 201 for driving second comb drives 212 between their first and second positions. Such electrical means can include a controller and voltage generator 161 electrically connected to a plurality of electrodes provided on the substrate 102 by means of a plurality of electrical leads 162. For simplicity, controller 161 and leads 162 are not shown in FIG. 4. Such electrodes, each of which is substantially similar to the electrodes discussed above with respective to microactuator 101, include a common electrode 266 electrically coupled by lead 267 to bracket member 253, at least one drive electrode 271 coupled directly or by means of lead 272 to first comb drive 211 of first comb drive assemblies 203 and one or more drive electrodes 273 coupled directly or by means of lead 274 to first comb drives 211 of second comb drive assemblies 204. Several leads 274 extending out of the plane of microactuator 201 are shown in phantom lines in FIG. 4. The position of mirror holder 202 and thus mirrors 61 and 68 can optionally be monitored in the manner discussed above with respect to microactuator 101.

Figure 5:
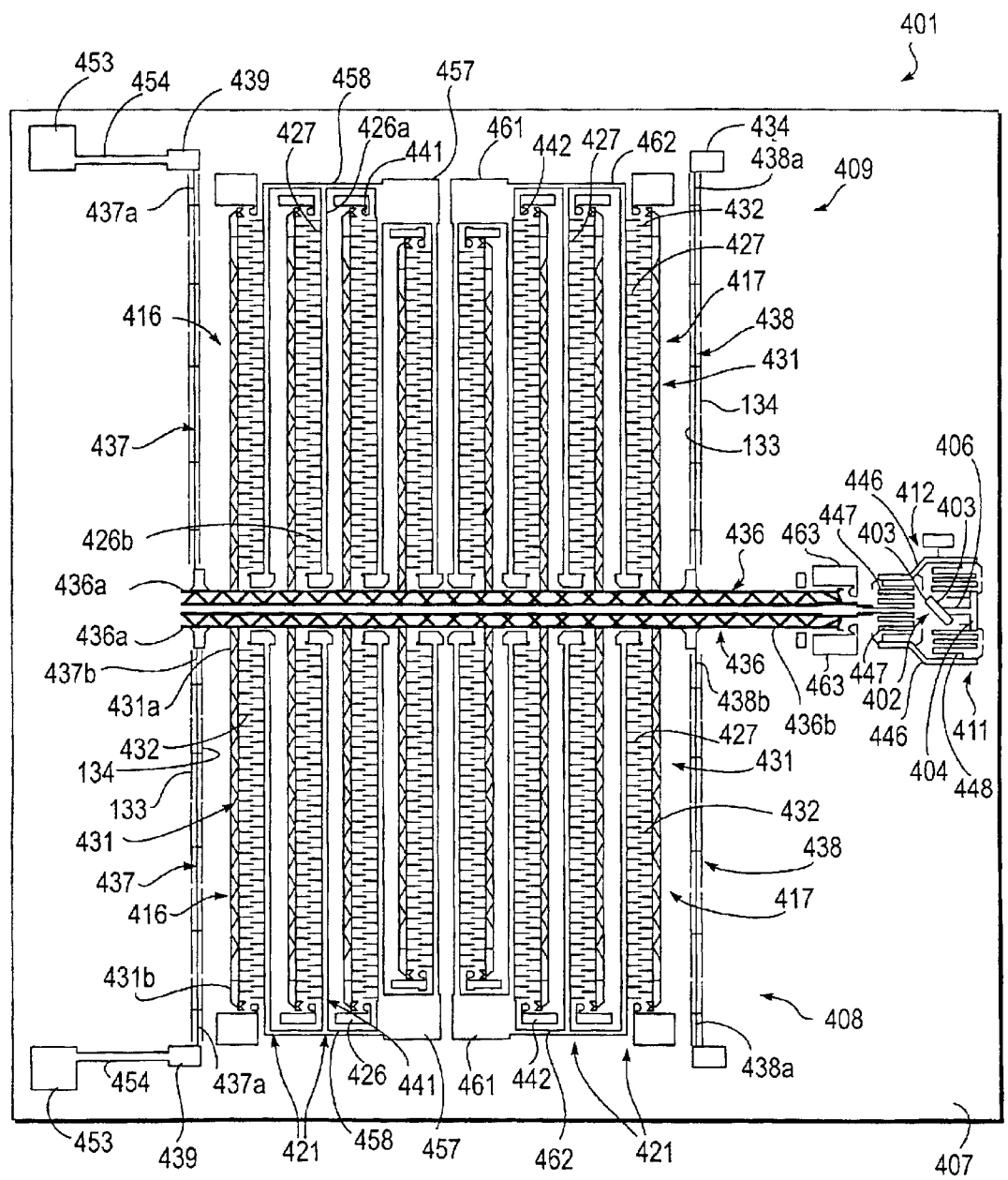
FIG. 5 is a plan view of a further embodiment of a rotary electrostatic microactuator for use in the optical microswitch of FIG. 1.

The rotary electrostatic microactuators of microswitch 11 can utilize other than radially-extending comb drive assemblies. An exemplary push-pull microactuator using coupled linear electrostatic micromotors is described in copending U.S. patent application Ser. No. 09/464,373 filed Dec. 15, 1999 and shown in FIG. 5. Rotary electrostatic microactuator 401 therein is similar in certain respects to microactuators 101 and 201 and like reference numerals have been used to describe like components of the microactuators 101, 201 and 401. The microactuator 401 includes a rotatable member 402 comprising a mirror holder, for mounting to the microactuator 401 a micromirror 403 extending out of the plane of microactuator 401, and a T-shaped bracket 404 secured to micromirror 403. The profile of micromirror 403 is shown in FIG. 5. The rotatable member 402 rotates about an axis of rotation 406 extending perpendicular to planar substrate 102 of the respective rotator chip 68 or 67. Axis of rotation 406 corresponds to axes of rotations 64 and 72 of the respective microactuators 56 and 57. The axis of rotation 406 intersects micromirror 403 at its reflective surface 403a and is identified as a point by reference numeral 406 in FIG. 5. Microactuator 401 is provided with at least one side 407 and rotatable member 402 is disposed adjacent the side 407. The microactuator 401 has first and second linear micromotors 408 and 409 and first and second couplers 411 and 412 for respectively securing first and second micromotors 408 and 409 to bracket 404.

First and second micromotors 408 and 409 are substantially identical in construction and are formed atop the substrate 102 from upper layer 116. The micromotors each includes at least one comb drive assembly and preferably includes at least one first comb drive assembly 416 and at least one second comb drive assembly 417. As shown, each of the micromotors 408 and 409 includes a plurality of four first comb drive assemblies 416 and a plurality of four second comb drive assemblies 471 aligned in parallel. First comb drive assemblies 416 are disposed side-by-side in a group and second comb drive assemblies 417 are similarly disposed side-by-side in a group. The group of assemblies 416 are disposed in juxtaposition to the group of assemblies 417.

Comb drive assemblies 416 and 417 can be of any suitable type. In one preferred embodiment, the comb drive assemblies are similar to the comb drive assemblies described in U.S. Pat. No. 5,998,906 issued Dec. 7, 1999 and in copending U.S. patent application Ser. No. 09/135,236 filed Aug. 17, 1998. The comb drive assemblies 416 and 417 are each provided with a first comb drive member or comb drive 421 mounted on substrate 102 and a second comb drive 422 overlying the substrate. First comb drives 421 are each formed from an elongate bar 426 having first and second end portions 426a and 426b. A plurality of linear comb drive fingers 427, shown as being linear, are secured to one side of the bar in longitudinally spaced-apart positions along the length of the bar. Comb drive fingers or comb fingers 427 extend perpendicularly from bar 426 and, as shown, can be of equal length and have a constant width along their length. Second comb drives 422 are similar in construction to first comb drives 421 and are each formed from a bar 431 having first and second end portions 431a and 431b. A plurality of linear comb fingers 432, shown as being linear, extend from one side of the bar 431 in longitudinally spaced-apart positions. Comb fingers 432 are substantially identical to comb fingers 427, but are offset relative to the comb fingers 427. When comb drive assemblies 416 and 417 are in their home or rest positions, comb fingers 427 and 432 are not substantially fully interdigitated and, preferably, are partially interdigitated as shown in FIG. 5.

An elongate member or shuttle 436 is included in each of first and second micromotors 408 and 409. Shuttle 436 has first and second end portions 436a and 436b. First end portion 431a of each of bars 431 is secured to shuttle 436 so that bars 431 extend perpendicularly from one side of the shuttle 436 between shuttle end portions 436a and 436b.

First and second spaced-apart spring members 437 and 438 are included in each of micromotors 408 and 409. Springs 437 and 438 can be of any suitable type and are preferably formed from at least one elongate beam-like member. In one preferred embodiment, springs 437 and 438 each consist of a single such beam-like member similar to first spring member 131 and to second spring member 132 discussed above. Springs 437 and 438 are substantially identical in construction and each include first and second sacrificial bars 133 and 134 disposed along opposite sides of the springs for the purposes discussed above. First spring 437 has first and second end portions 437a and 437b and second spring 438 has first and second end portions 438a and 438b. The spring second end portion 437b is secured to shuttle first end portion 436a and the spring second end portion 438b is secured to shuttle second end portion 436b. As a result, at least one and as shown all of first and second comb drive assemblies 416 and 417 are disposed between first and second springs 437 and 438. The springs 437 and 438 preferably extend perpendicular to shuttle 436 when comb drive assemblies 416 and 417 are in their home or rest positions. Each of the first and second springs 437 and 438 preferably has a length approximating the length of comb drive assemblies 416 and 417 so that first end portions 437a and 438a are disposed adjacent the second end portions 426b and 431b of the comb drive bars 426 and 431. An attachment block 439 is secured to substrate 102 for each spring 437 and 438 and serves to attach the first end portions 437a and 438a of the first and second springs to the substrate 102.

Second comb drives 422, shuttle 436 and first and second springs 437 and 438 are spaced above substrate 102 by air gap 118 so as to be electrically isolated from the substrate and movable relative to the substrate. These structures can have any suitable thickness and preferably each have a thickness ranging from 10 to 200 microns and more preferably approximately 85 microns. First and second springs 437 and 438 are included within the means of microactuator 401 for suspending and movably supporting second comb drives 422 over substrate 102.

The second comb drives 422 are movable in a linear direction of travel relative to first comb drives 421 between first positions, as shown in FIG. 5, in which comb fingers 427 and 432 are not substantially fully interdigitated and second positions in which the comb fingers 427 and 432 are substantially fully interdigitated. When in their second positions, comb fingers 432 extend between respective comb fingers 427 and approach but preferably do not engage first comb drive bar 426. Second comb drive members 422 of first comb drive assemblies 416 are in their second positions when second comb drives 422 of second comb drive assemblies 417 are in their first positions. Conversely, the second comb drives of first comb drive assemblies 416 are in their first positions when the second comb drives of second comb drive assemblies 417 are in their second positions.

The movement of second comb drives 422 to their first and second positions causes shuttle 436 to move in opposite first and second linear directions relative to substrate 102. Such directions of travel are substantially perpendicular to the disposition of the elongate first and second comb drive assemblies 416 and 417. A plurality of first stops 441 are secured to substrate 102 for limiting the travel of second comb drives 422 of first comb drive assemblies 416 towards their respective first comb drives 421. A plurality of similar second stops 442 are secured to the substrate for limiting the travel of second comb drives 422 of second comb drive assemblies 417 towards their respective first comb drives 421. In one preferred embodiment, first and second micromotors 408 and 409 are disposed in juxtaposition so that respective shuttles 436 are disposed side-by-side in parallel with each other. Second end portions 436b of the shuttles 436 each generally point towards micromirror 403 and are centered relative to axis of rotation 406.

First and second couplers 411 and 412 are suspended above substrate 102 by air gap 118 and have a first end secured to shuttle second end portion 436b and a second end secured to the bracket 404. The couplers 411 and 412 are preferably symmetrically disposed relative to each other with respect to axis of rotation 406. First coupler 411 secures shuttle 436 of the first micromotor 408 to one side of bracket 404 and second coupler 412 secures second micromotor 409 to the other side of bracket 404. In one preferred embodiment, each of the first and second couplers has at least one spring member or coupling spring to provide a non-rigid connection between the shuttle 436 and the bracket 404. In a particular preferred embodiment, each of the first and second couplers 411 and 412 includes a rigid strip 446 secured at one end to shuttle 436 by means of a first coupling spring 437 and secured at its other end to bracket 404 by a second coupling spring 448.

Electrical means is included within microactuator 401 for driving second comb drives 422 of the first and second micromotors 408 and 409 between their first and second positions. Such electrical means includes a suitable controller and voltage generator such as controller and voltage generator 161 electrically coupled to a plurality of electrodes by means of a plurality of electrical leads 162. For simplicity, controller 161 and leads 162 are not shown in FIG. 5. Such electrodes, each of which is substantially similar to the electrodes described above with respect to microactuator 101, include first and second ground electrodes 453 which are electrically coupled by means of respective leads 454 to attachment block 439 for first springs 437 so as to electrically ground first and second springs 437 and 438, shuttle 436 and second comb drives 422 of each of the micromotors 408 and 409. A first drive electrode 457 is electrically coupled, either directly or by means of leads 458, to first comb drives 421 of the first comb drive assemblies 416 of each micromotor 409 and 409. A second drive electrode 461 is electrically coupled, either directly or by means of lead 462, to the first comb drives 421 of the second comb drive assemblies 417 of the micromotors 408 and 409. An additional stop 463 secured to substrate 102 can additionally be provided for each micromotor 408 and 409 to limit the forward travel of shuttle 436 towards rotatable member 402. The position of rotatable member 402 and thus mirrors 61 and 68 can optionally be monitored in the manner discussed above with respect to microactuator 101.

Figure 6:
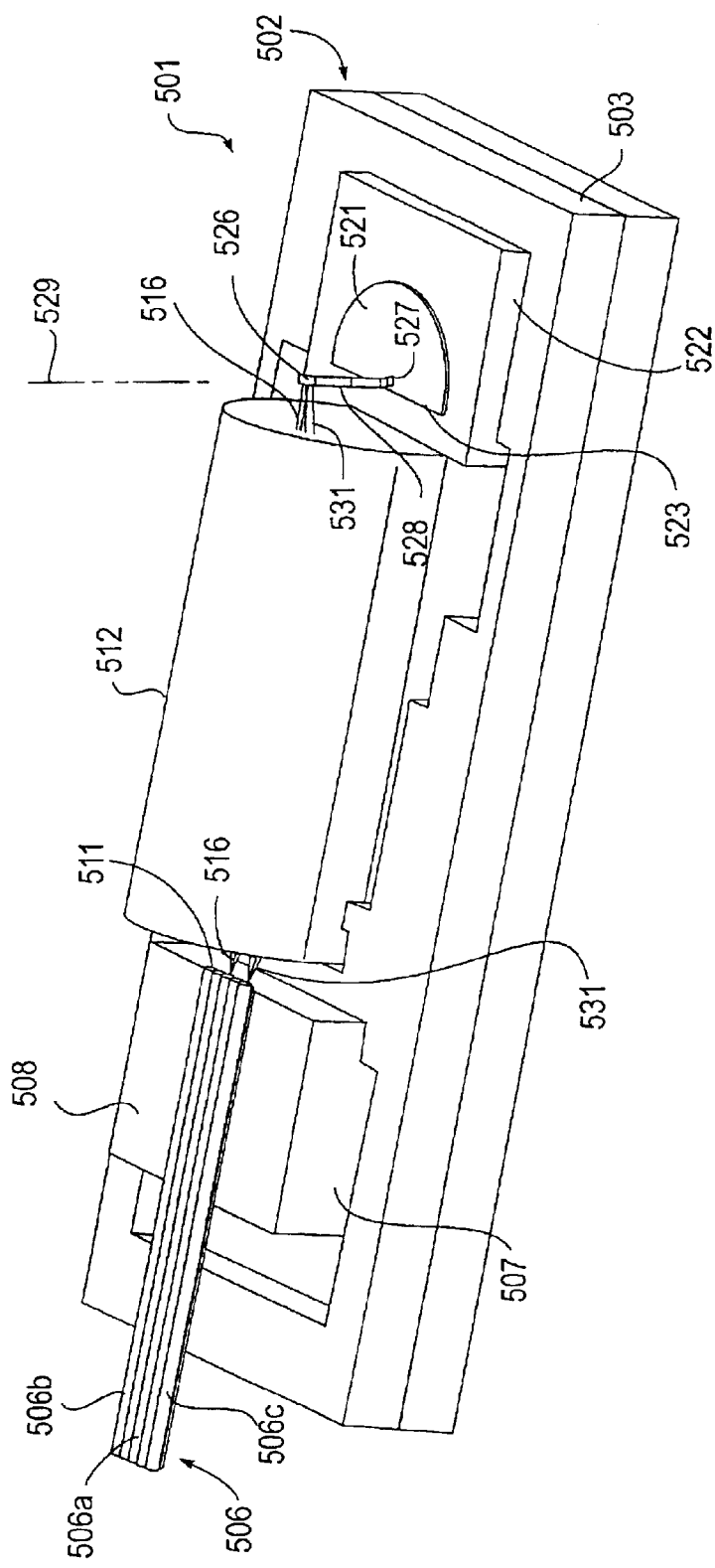
FIG. 6 is a perspective view of another embodiment of an optical microswitch with rotary electrostatic microactuator of the present invention.

Other optical microswitches utilizing rotary electrostatic microactuators can be provided. Optical microswitch 501 shown in FIG. 6 is formed from a support body 502 of any suitable size and shape and made from any suitable material such as a ceramic material. Support body 502 has a base 503 and is preferably coupled to a plurality of optical fibers. As shown in FIG. 6, a plurality of five optical fibers 506 are coupled to base 503 by any suitable means such as block 507. The fibers 506 include an input fiber 506a and a plurality of output fibers which can be any of the fibers 506. First and second output fibers 506b and 506c are identified in FIG. 6. The optical fibers 506 are secured to a planar surface 508 of block 507 by any suitable means such as an adhesive (not shown). Fibers 506 extend parallel to each other and are preferably arranged in juxtaposition on surface 508 with respective end surfaces 511 linearly aligned across the block 507. Input fiber 506a is preferably at the center of fibers 506. A conventional collimating and focusing lens such as GRIN lens 512 is disposed adjacent end surfaces 511 of optical fibers 506 and is mounted on base 503 by any suitable means such as an adhesive (not shown). Lens 512 has a sufficient field of view to accommodate all of fibers 506. The glass surfaces of fibers 506 and lens 512 are coated in a conventional manner with an anti-reflective material. An input laser beam 516 is directed from input fiber 506a along a path.

A rotary electrostatic microactuator 521 is carried by support body 502 for directing input laser beam 516 to first output fiber 506b, second output fiber 506c or any of the other fibers 506. Microactuator 521 is formed from a planar rotator chip 522 secured to base 503 by any suitable means such as an adhesive (not shown). For simplicity, microactuator 521 and rotator chip 522 are shown schematically in FIG. 6. The microactuator 521 is disposed on base 503 such that the plane of the microactuator is parallel to input laser beam 516. Microactuator 521 is fanlike in shape and is arranged on support body 502 such that the diametric base 523 of microactuator 521, corresponding for example to base 119 of microactuator 101, is disposed adjacent lens 512 and perpendicular to input laser beam 516. A micromachined mirror 526 substantially similar to first mirror 61 discussed above is included in optical microswitch 501. Micromachined mirror 526 extends out of the plane of microactuator 521 and is secured to the microactuator by means of a post 527 preferably formed integral with micromirror 526. Post 527 is joined at its base to microactuator 521 by an adhesive (not shown) or any other suitable means. Micromirror 526 has a reflective face or surface 528 rotatable by microactuator 521 about an axis of rotation 529 extending through post 527 and disposed perpendicular to the plane of microactuator 521 and to input beam 516. Axis of rotation 529 is preferably disposed at the focal plane of lens 512 and mirror 526 has a sufficient range of rotation to permit the mirror to direct output beam 531, by means of lens 512, onto the core of each of optical fibers 506.

Any suitable micromachined actuator can be utilized for microactuator 521, including any of the microactuators disclosed in copending U.S. patent application Ser. No. 09/464,373 filed Dec. 15, 1999 and any of such microactuators 101, 201 and 401 discussed above.

In operation and use, microactuator 521 is utilized to rotate micromirror 526 to reflect input laser beam 516 and cause the output laser beam 531 to impinge the image plane of lens 512 for coupling into first or second output optical fibers 506b or 506c. Rotation of micromirror 526 about axis of rotation 529 controls the position at which output laser beam 531 impinges lens 512 and thus the optical fiber 506 into which output beam 531 is directed. In its rest position, micromirror 526 is preferably aligned on microactuator 521 so that its reflective surface 528 is parallel with base 523 of the microactuator 521. Additionally, as disclosed above, it is preferable that input fiber 506a be one of the centermost optical fibers 506. Such central disposition of input fiber 506a and the disposition of micromirror 526 parallel to base 528 minimizes the rotational travel of the micromirror when directing the output beam 521 to the desired output fiber 506. For example, micromirror 526 need be rotated only slightly in the clockwise direction for directing output laser beam 531 into first output fiber 506b. Similarly, slight counterclockwise rotation of micromirror 526 about axis 529 results in output laser beam 531 being directed into second output fiber 506c, as shown in FIG. 6. In addition, use of the central fiber 506 as the input fiber facilitates the input beam 516 impinging reflective surface 528 on the axis of rotation of micromirror 526. Micromirror 526 is capable of +/−six degrees angular rotation, that is a rotation of six degrees in both the clockwise and counterclockwise directions for an aggregate rotation of twelve degrees, although approximately +/−four degrees or less of angular rotation is sufficient in microswitch 501.

The disposition of axis of rotation 529 adjacent the base 523 of microactuator 521 facilitates placement of the reflective face 528 of micromirror 526 in the focal plane of lens 512. Bidirectional optical microswitch 501 has a relatively small form factor of less than approximately one cubic centimeter. The microswitch 501 is suitable for use in a fiber optic network of a telecommunications system, but can also be used in other applications such as in a computer data storage system.

As can be seen from the foregoing, a relatively inexpensive optical microswitch having a small form factor has been provided. The microswitch has a micromirror with a reflective face that rotates in the focal plane of a focusing lens. The microswitch can optionally be provided with first and second micromirrors that are closely packed and disposed in the focal plane of a focusing lens. The microswitch is capable of coupling visible light into a single mode or multi-mode optical fiber with low transmission losses and has relatively fast switching times. The mirror of the microswitch is capable of angular rotations over a relatively large range.

What is claimed is:

1. An optical microdevice comprising a support body, a rotatable microactuator carried by the body and extending in a plane and an optical element carried by the body and rotatable about an axis extending perpendicular to the plane, the microactuator being coupled to the optical element for driving the optical element about the axis.

2. The microdevice of claim 1 wherein the microactuator is an electromechanical microactuator.

3. The microdevice of claim 2 wherein the electromechanical microactuator is an electrostatic microactuator.

4. The microdevice of claim 3 wherein the electrostatic microactuator has at least one first comb drive assembly coupled to the optical element for driving the optical element in a first direction of travel about the axis and at least one second comb drive assembly coupled to the optical element for driving the optical element in an opposite second direction about the axis.

5. A microdevice comprising a substrate extending in a plane, a movable member overlying the substrate for rotation about an axis, a microactuator carried by the substrate for imparting translational motion in a direction substantially parallel to the plane of the substrate, at least one coupler coupling the movable member to the microactuator whereby translational motion imparted by the microactuator on the at least one coupler causes rotation of the movable member about the axis.

6. The microdevice of claim 5 wherein the microactuator is an electromechanical microactuator.

7. The microdevice of claim 6 wherein the electromechanical microactuator is an electrostatic microactuator.

8. The microdevice of claim 5 further comprising an optical element carried by the movable member.

9. An optical microdevice comprising a first optical member for providing a first beam of light and a second optical member for providing a second beam of light, an optical waveguide and an adjustable microelectromechanical optical element for selectively coupling one of the first and second beams of light into the optical waveguide.

10. The optical microdevice of claim 9 wherein the adjustable microelectromechanical optical element is a mirror, a microelectromechanical actuator coupled to the mirror for tilting the mirror to selectively couple said one of the first and second beams of light into the optical waveguide.

11. The optical microdevice of claim 10 wherein the microelectromechanical actuator is disposed in a plane and the mirror is pivotable about an axis extending perpendicular to the plane.

12. An optical microdevice comprising a first optical member for providing a first beam of light and a second optical member for providing a second beam of light, a mirror, a collimating lens disposed between the first and second optical members and the mirror for collimating the first and second beams of light, an optical waveguide and a microelectromechanical actuator coupled to the mirror for tilting the mirror to selectively couple one of the first and second beams of light into the optical waveguide.

13. The optical microdevice of claim 12 wherein the microelectromechanical actuator includes an electrostatic actuator.

14. The optical microdevice of claim 12 further comprising a focusing lens disposed between the mirror and the optical waveguide for focusing said one of the first and second beams of light into the optical waveguide.

15. The optical microdevice of claim 12 wherein at least one of the first and second optical members is a laser.

16. An optical microdevice comprising first and second optical waveguides, a rotatable microactuator, a mirror coupled to the microactuator and pivotable about an axis and a lens having opposite first and second focal planes disposed between the first and second optical waveguides and the mirror, the first and second optical waveguides being positioned substantially at the first focal plane of the lens and the mirror being positioned substantially at the second focal plane of the lens whereby the mirror can be pivoted about the axis by the microactuator to direct optical energy from the first optical waveguide to the second optical waveguide.

17. The optical microdevice of claim 16 wherein at least one of the first and second optical members is an optical fiber.

18. An optical microdevice comprising at least one input optical waveguide for providing optical energy, a collimating lens for forming an optical laser beam from the optical energy, a mirror for receiving the optical laser beam, at least one microactuator coupled to the mirror for pivoting the mirror, at least one output optical waveguide and a focusing lens for focusing the optical laser beam from the mirror into the at least one output optical waveguide.

19. The optical microdevice of claim 18 wherein the at least one output optical waveguide includes at least one optical fiber.

20. The optical microdevice of claim 18 wherein the at least one microactuator includes an electrostatic microactuator.

21. An optical microdevice for directing optical energy comprising a support body, at least first and second optical waveguides carried by the body, a third optical waveguide, a rotatable electrostatic microactuator carried by the body and extending in a plane, a micromachined, planar mirror disposed out of the plane and pivotable about an axis, the microactuator having at least one comb drive assembly coupled to the mirror for driving the mirror about the axis between a first position for directing optical energy from the first waveguide to the third waveguide and a second position for directing optical energy from the second waveguide to the third waveguide.

22. The optical microdevice of claim 21 further comprising a first focusing lens disposed between the first and second waveguides and the mirror.

23. The optical microdevice of claim 22 further comprising a second focusing lens disposed between the mirror and the third waveguide.

24. The optical microdevice of claim 21 wherein the third waveguide is carried by the body.

25. An optical microdevice for directing optical energy comprising a support body, first and second optical waveguides and a rotatable electrostatic microactuator carried by the body, a third optical waveguide, a micromachined, planar mirror pivotable about an axis, the microactuator being coupled to the mirror for driving the mirror about the axis between a first position for directing optical energy from the first waveguide to the third waveguide and a second position for directing optical energy from the second waveguide to the third waveguide.

26. The optical microdevice of claim 25 further comprising a first focusing lens disposed between the first and second waveguides and the mirror.

27. The optical microdevice of claim 26 further comprising a second focusing lens disposed between the minor and the third waveguide.

28. An optical microdevice for selecting an optical signal comprising a first optical member for providing a first beam of light and a second optical member for providing a second beam of light, a mirror, a collimating lens disposed between the first and second optical members and the mirror for collimating the first and second beams of light, an optical waveguide, and a microelectromechanical actuator coupled to the mirror for tilting the mirror to selectively couple one of the first and second beams of light into the optical waveguide.

29. The optical microdevice of claim 28 wherein the microelectromechanical actuator includes at least one electrostatic actuator for tilting the mirror.

30. The optical microdevice of claim 28 further comprising a focusing lens disposed between the mirror and the optical waveguide for focusing said one of the first and second beams of light into the optical waveguide.

* * * * *